United States Patent [19]

Schmid

[11] Patent Number: 5,107,566
[45] Date of Patent: Apr. 28, 1992

[54] DIRECTED DISCHARGE BLOWER CHUTE AND METHOD

[76] Inventor: Roy J. Schmid, 170 Autumn Dr., Southington, Conn. 06489

[21] Appl. No.: 721,125

[22] Filed: Jun. 26, 1991

[51] Int. Cl.⁵ .............................................. A47L 7/04
[52] U.S. Cl. ....................................... 15/338; 15/328; 15/405; 56/192
[58] Field of Search ................. 15/328, 330, 338, 405, 15/345; 56/192

[56] References Cited

U.S. PATENT DOCUMENTS

| | | | |
|---|---|---|---|
| 1,245,629 | 11/1917 | Smith | 15/345 X |
| 1,399,165 | 12/1921 | Spencer | 15/345 X |
| 2,495,032 | 1/1950 | Stuhl | 56/192 |
| 2,756,556 | 7/1956 | Watkins | 56/192 X |
| 2,824,335 | 2/1958 | Moffat | 15/345 |
| 3,142,913 | 8/1964 | Jacob | 15/328 X |
| 3,491,399 | 1/1970 | Dolan et al. | 15/328 X |
| 3,959,846 | 6/1976 | Yasuda | 15/405 X |
| 4,757,672 | 7/1988 | Roger | 56/192 |

Primary Examiner—Chris K. Moore
Attorney, Agent, or Firm—Victor E. Libert; Frederick A. Spaeth

[57] ABSTRACT

An outlet chute (10) for a blower device to guide the expulsion of leaves, grass or other debris, having an inlet portion (26) and a bifurcated outlet portion (28) including a first outlet duct (30) and a second outlet duct (32) which direct debris in opposing lateral directions. A deflector vane (34) is disposed within bifurcated outlet portion (28) to deflect expelled debris to one of the first outlet duct and second outlet duct. The first outlet duct (30) allows for the expulsion of debris in substantially the same direction in which it leaves the blower housing and is configured to expel the debris closer to the ground than second outlet duct (32), which expels debris with less thrust and at higher elevation. A method of using a blower device equipped with the chute includes making a series of parallel passes with each pass in a direction opposite to that of its adjacent passes.

13 Claims, 4 Drawing Sheets

DIRECTED DISCHARGE BLOWER CHUTE AND METHOD

BACKGROUND OF THE INVENTION

1. Field of the Invention

This invention concerns blower discharge chutes of the type used on lawn mowers or other powered cultivating equipment, and the like, and more specifically to bi-directional blower discharge chutes.

2. Background and Related Art

When using a blower or mower to remove leaves, grass cuttings, or other debris from a parcel of land of any significant size, the accumulation of the cut and/or blown debris becomes important for convenient disposal. For this purpose, some such devices are equipped with bags or other capture devices to hold the debris until such time as it may be conveniently disposed of. In the absence of a collection bag, some blower devices are equipped with special chutes to direct the placement of debris. For example, U.S. Pat. No. 2,770,894 to Gettleman, dated Nov. 20, 1956, discloses a dual directional snow discharge chute. As best seen in FIGS. 1-3 and described at column 4, lines 6-29, Gettleman discloses a bifurcated discharge chute having a deflector valve 116 therein to close off one of the openings and open the other to control to which side of the remover the snow will be projected. A pair of pivotable guides 120 are located at the ends of the upward directed discharge chute to control the angle at which snow will be ejected from the manifold.

U.S. Pat. No. 3,136,488 to Petlak et al, dated June 6, 1984, discloses an adjustable nozzle for jet snow melters, the nozzle having two outlets and a pivotable deflector vane to guide outgoing snow through one or the other of the outlets. The position of the vane can be controlled by manipulating a handle accessible to the user.

The use of a deflector vane placed in the mulch expulsion path to control the direction of expulsion is known in the art and may be seen, for example, in U.S. Pat. No. 1,092,720 to Kluge, dated Apr. 7, 1914; U.S. Pat. No. 2,871,585 to Merry et al, dated Feb. 3, 1959; and U.S. Pat. No. 2,977,694 to Higby, dated Apr. 4, 1961.

The attachment of a chute to the outlet port of a lawn mower is taught by Watkins, in U.S. Pat. No. 2,756,556, dated Jul. 31, 1956.

U.S. Pat. No. 3,690,047 to Thoen et al, dated Sep. 12, 1972 discloses a combination lawn mower and snow blower which impels debris upwardly to a central outlet port which is covered with a rocking deflector hood to allow the user to direct the outgoing debris to one side or the other of the machine.

U.S. Pat. No. 3,562,932 to Rautio dated Feb. 16, 1971 discloses a snow blower attachment for rotary lawn mowers including a damper for controlling the pitch of outgoing snow or debris.

United Kingdom Patent 1,246,587 to Victa Limited teaches that a lawn mower may be used as a sweeping device as well as a cutting device, and U.S. Pat. No. 2,675,660 to Barnard, dated Feb. 15, 1951, discloses a combination mower, lawn cleaner and snow mover.

SUMMARY OF THE INVENTION

In accordance with the present invention there is provided a bi-directional debris chute for use in combination with a ground blower device, the device having a horizontal rotating impeller which expels blown debris through an outlet port. The debris chute according to the present invention comprises an inlet portion connectible to the outlet port of the blower device for receiving debris therefrom and a bifurcated outlet portion in flow communication with the inlet portion for discharging blown debris from the debris chute. The bifurcated outlet portion comprises a first outlet duct terminating in a first discharge end and a second outlet duct terminating in a second discharge end, the first and second discharge ends facing in laterally opposite directions to respectively discharge blown debris to laterally opposite sides of the debris chute. The first and second outlet ducts are dimensioned and configured so that the first outlet duct imposes a greater pressure drop upon the blown debris than does the second outlet duct whereby, at a given output level of the impeller, blown debris is discharged with greater force from the second outlet duct than from the first outlet duct. The present invention further comprises an adjustable deflector vane, mounted in the debris chute, which is movable between a first position in which the first outlet duct is open and the second outlet duct is blocked, and a second position in which the first outlet duct is blocked and the second outlet duct is open, for selectively discharging the blown debris from only one of the first and second outlet ducts.

In one aspect of the present invention, the debris chute is combined with a transportable blower device comprising a housing which defines an outlet port for expelling debris from the housing. A horizontally rotating impeller is rotatably mounted within the housing for impelling debris in a horizontal circular path within the housing, and power means are mounted on the housing for rotating the impeller. According to this aspect of the invention, the blower device may be, for example, a powered lawn mower. The powered mower may comprise a mower blade for both expelling debris and chopping or cutting debris into mulch debris.

According to another aspect of the present invention, the first outlet duct of the debris chute is dimensioned and configured to impose on the blown debris approximately a ninety degree change in direction from the direction of peripheral rotation of the impeller in the vicinity of the inlet duct, and the second outlet duct is dimensioned and configured to impose on the blown debris a change of direction of less than about thirty degrees from the direction of peripheral rotation of the impeller in the vicinity of the inlet duct.

Another aspect of the present invention provides that the first outlet duct be dimensioned and configured to discharge blown debris at a greater height from the ground than the second outlet duct.

The adjustable deflector vane in a debris chute according to this invention may have a contour which is curved to conform to the curvature of the first outlet duct when the deflector vane is in its second position. The adjustable deflector vane may comprise lever means for moving the adjustable deflector vane between its first and second positions.

In another aspect of the present invention, there is provided a method for clearing debris from a littered area using a device adapted to be propelled in selected travel directions to expel debris selectively in one of first and second opposite lateral discharge directions and with a greater degree of force in the first discharge direction than in the second discharge direction. The method of this invention comprises selecting the first discharge direction and making a first pass by propelling the device in a first travel direction in the first lane to deposit debris and form a debris bank located more than one lane from the first lane, and then selecting the second discharge direction and making a second pass in a second travel direction opposite to the first travel direction in a second lane abutting the first lane and located between the first lane and the debris bank, whereby debris is discharged during the second pass in the same direction as in the first pass and the debris is deposited on the debris bank.

The method may comprise making additional passes in sequentially adjacent lanes, alternating the travel direction and changing the discharge direction on each additional pass, thereby moving the debris bank on each pass in which the device moves in a direction parallel to the first pass. The debris is also re-mulched with each pass of the mower, thereby reducing the particle size of the mulched debris. Experience has shown that the volume (and density) of the debris is reduced with each additional pass as the particles are further reduced in size. If the initial amount of debris is not unduly large, i.e., if a lawn is cut with reasonable frequency or fallen leaves are cleared at reasonable intervals, the debris is mulched to such a fine, dust-like particle size by the device of the invention that it may be dispersed on the lawn as a mulch fertilizer and not be visible so as to be an eyesore. If the debris volume is large, for example, an entire season's worth of fallen leaves, a dramatic reduction in volume is attained by using the device of the invention. This is especially important because many localities prohibit the burning of leaves and other debris and many refuse to collect debris such as leaves and grass clippings at all, thereby imposing private collection costs or disposal.

In one aspect of the present invention, clearing debris may include operating the device to overlap a minor portion of each prior lane. In another aspect of the method according to the present invention, clearing debris may include chopping and re-chopping debris into mulch debris with each pass of the device.

As used herein and in the claims, the term "propellable", when used to describe a blower device, means that the device is designed to be used by propelling the device, manually or by a drive mechanism, over an area of ground. Thus, a conventional wheel-mounted powered mower or the like, whether manually or self-propelled, is "propellable" as that term is used herein.

DETAILED DESCRIPTION OF THE INVENTION AND PREFERRED EMBODIMENTS THEREOF

Figure 1A:
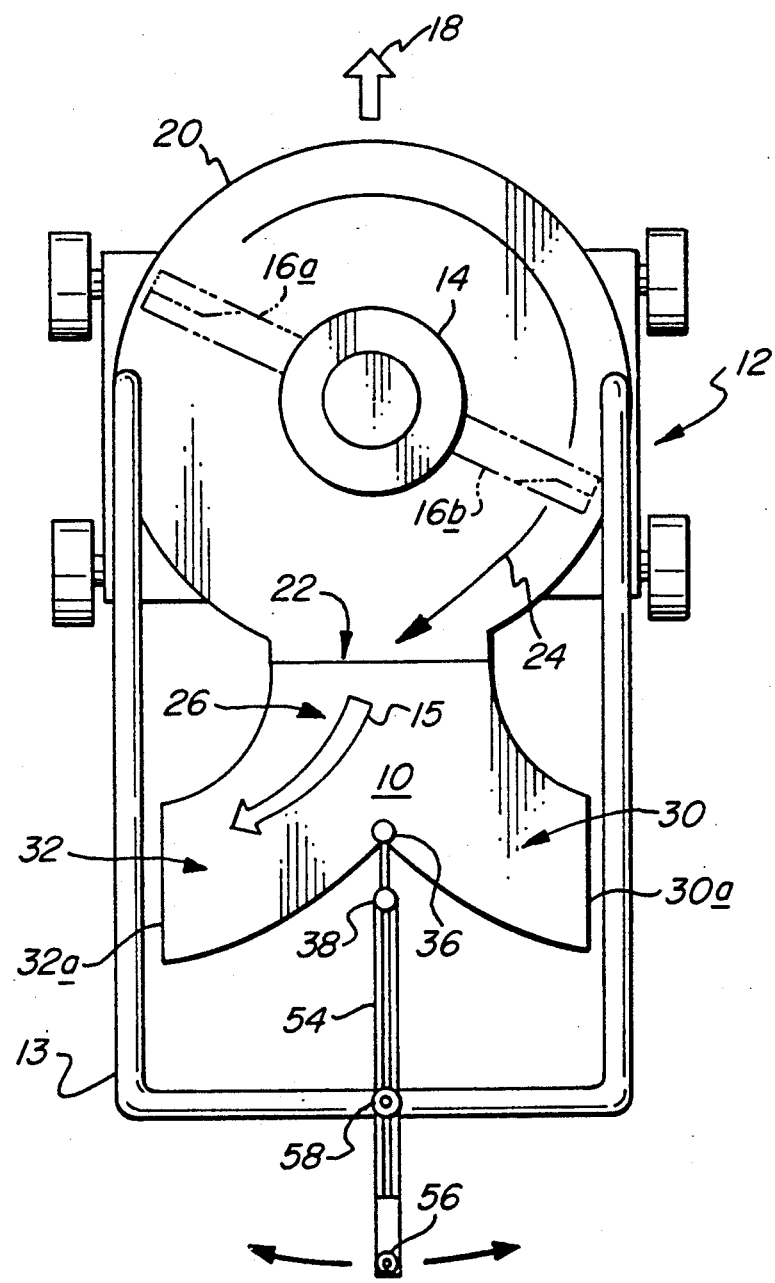
FIG. 1A is a schematic plan view of a lawn mower equipped with a debris chute according to one embodiment of the present invention.

There is shown in the schematic plan view of FIG. 1A a debris chute 10 according to this invention attached to a blower device shown as a conventional, propellable rotary lawn mower 12. Generally, the blower device employed in combination with the debris chute comprises a mower or other device having a blade or the like capable of chopping debris, such a leaves or grass clippings, into mulch. Lawn mower 12 includes a power means such as a conventional gasoline-driven engine 14 which rotates a conventional mower blade having blade arms 16a and 16b, in a clockwise direction (indicated by arrow 24) and in a plane parallel to the ground, i.e., horizontally. Arms 16a and 16b serve to both cut grass or other growth or debris and impel air and entrained debris (grass clippings, leaves, etc.) to travel in a circular path within a rotor housing 20. Lawn mower 12 may be either a self-propelled mower or a mower designed to be pushed by the user in a conventional manner. In either case the travel direction of the mower in use is indicated by travel direction arrow 18. The operator walks behind mower 12 and holds handle 13 to push or guide mower 12 as it travels in the direction of arrow 18. Rotor housing 20 of lawn mower 12 includes a rear outlet port 22 through which cut grass, leaves, or other material ("debris") is expelled from rotor housing 20 in the direction substantially tangential to the rotation of blade arms 16a and 16b (as indicated by rotation arrow 24) at the outlet port in the direction showns by discharge arrow 15. Debris chute 10 is fixed to rotor housing 20 by any suitable means so that inlet portion 26 of debris chute 10 communicates with outlet port 22 to receive blown debris (the blown air and entrained debris) therefrom.

Figure 1B:
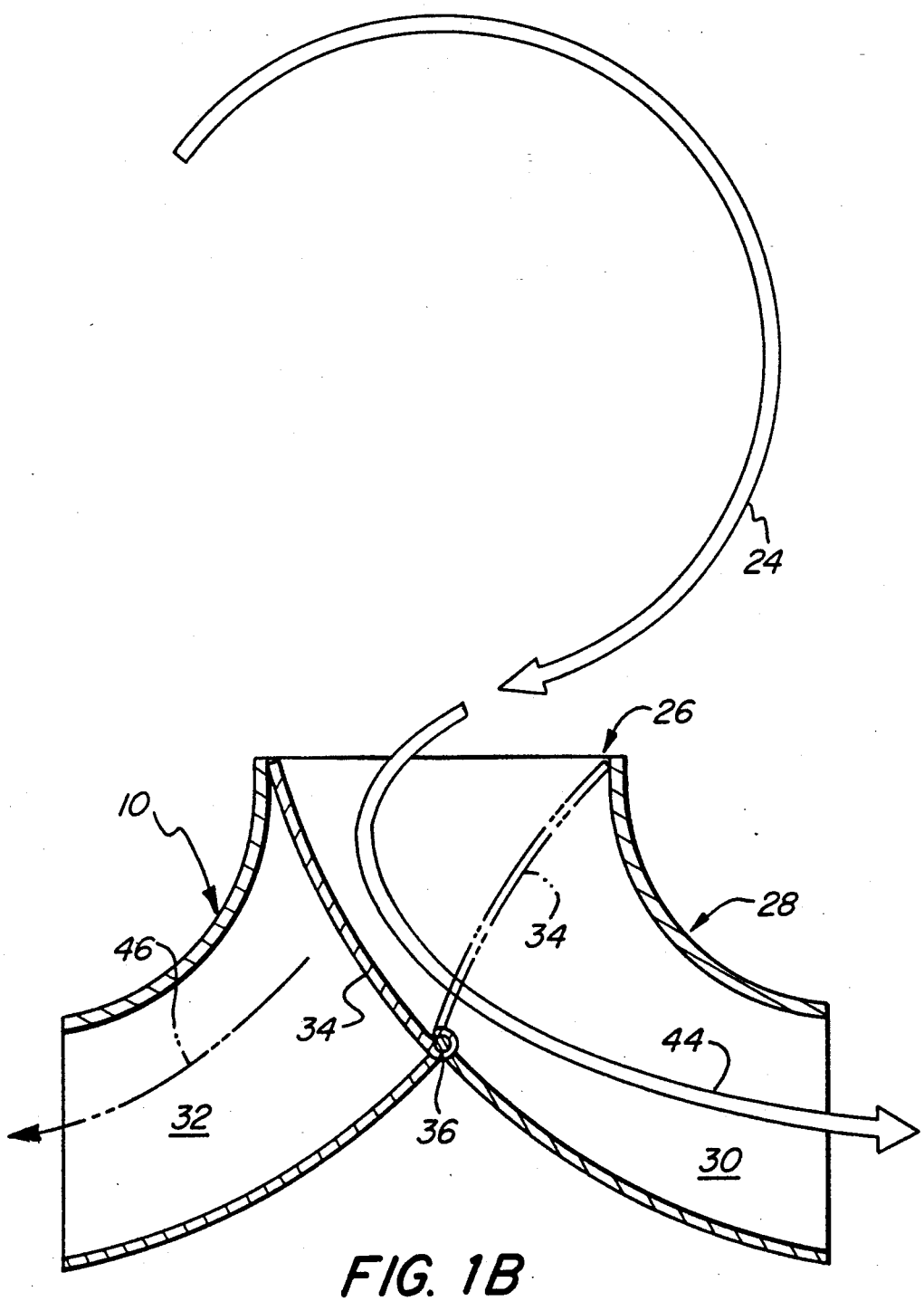
FIG. 1B is an enlarged plan view of the debris chute shown in FIG. 1A with the top surface removed.

Debris chute 10 includes a bifurcated outlet portion 28, FIG. 1B, which comprises first outlet duct 30 and second outlet duct 32. Inlet portion 26 is in flow communication with bifurcated outlet portion 28, i.e., debris entering inlet portion 26 flows directly into bifurcated outlet portion 28. Disposed within discharge chute 10 is a deflector vane 34 which is pivotable about hinge 36 between a first position (shown in solid line in FIG. 1B) and a second position (shown in phantom outline in FIG. 1B). When in the first position, deflector vane 34 obstructs second outlet duct 32 from inlet portion 26 while leaving first outlet duct 30 open, thereby guiding blown debris to exit debris chute 10 through first outlet duct 30 and out first discharge end 30a. When in the second position, deflector vane 34 obstructs first outlet duct 30 and leaves second outlet duct 32 open, thereby guiding blown debris to exit debris chute 10 through second outlet duct 32 and out second discharge end 32a.

Figure 2:
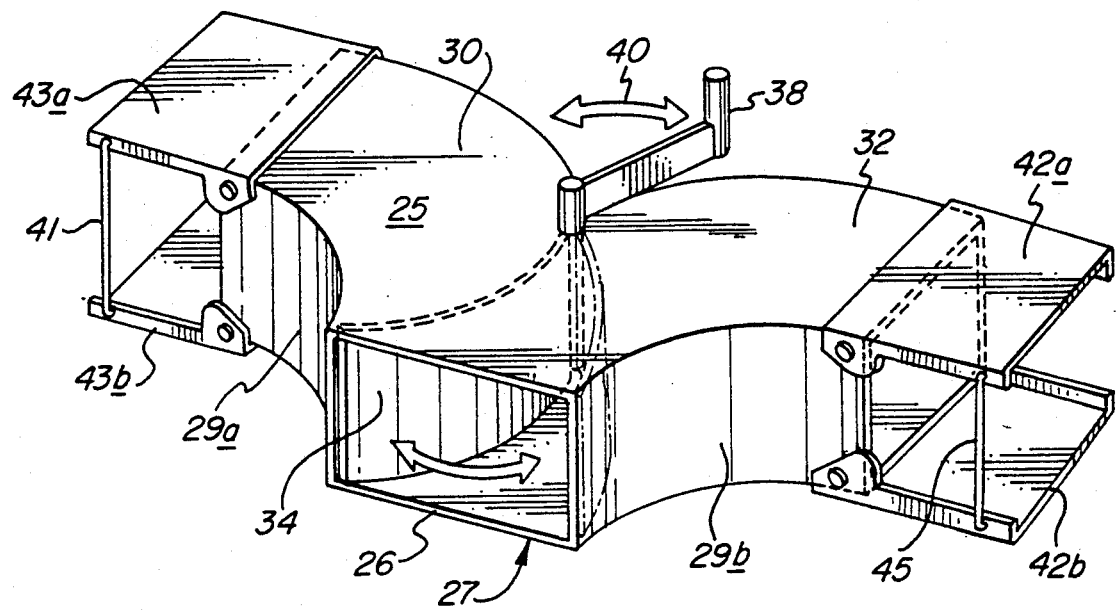
FIG. 2 is a front perspective view of a debris chute according to one embodiment of the present invention.
Figure 3:
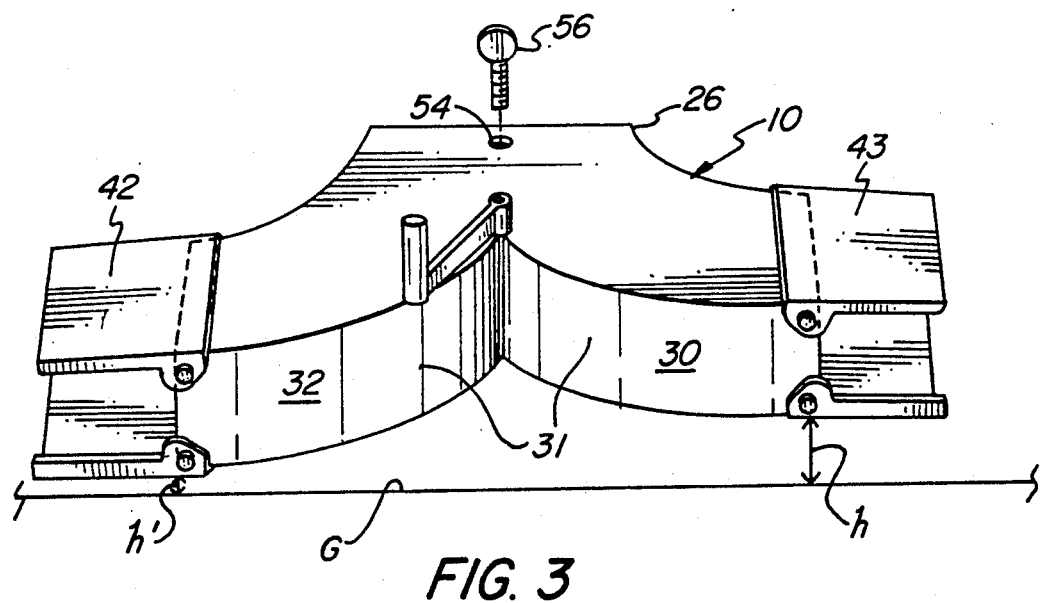
FIG. 3 is a rear perspective view of the debris chute of FIG. 2.

The overall configuration of a debris chute according to this invention is more clearly seen in FIG. 2. Inlet portion 26, first outlet duct 30 and second outlet duct 32 are all peripherally closed and bounded by top panel 25, bottom panel 27 and front panels 29a, 29b and a back panel 31 (shown in FIG. 3). In the embodiment shown in FIG. 2, an operating lever 38 is attached to deflector vane 34 so that the user may conveniently pivot deflector vane 34 between the second position, as shown, and the first position of FIG. 1B, by swinging operating lever 38 about hinge 36 in the direction of arrow 40. Optionally, lever 38 may be operated through a linkage (FIG. 1A) which provides an operator handle 56 convieniently carried on handle 13 of blower device 12. Linkage 54 is slotted and is pivotably fixed to handle 13 by pinion 58. By moving operator handle 56 to one side or the other and simultaneously sliding linkage 54 forward, the user can manipulate lever 38 from an upright standing position. Linkage 54 is just one example of a mechanism which allows the user to manipulate deflector vane 34 from the standing position. Other such mechanisms will be apparant to those skilled in the art, and any other suitable connection or control may of course be used. The illustrated embodiment further comprises damper members 42a and 43a which are pivotably mounted to first discharge end 30a of first outlet duct 30 and second discharge end 32a of second outlet duct 32 so that, e.g., damper member 42a may be pivoted to direct the pitch (i.e., height) of outgoing debris exiting first outlet duct 30. Optionally, complementary damper members 42b and 43b may also be attached to the respective discharge ends, to improve the control over the attitude of discharge of the debris. Complementary damper members may be linked by traces 41 and 45, respectively, or, may be independently adjustable, as shown in FIG. 3.

As blade arms 16a and 16b, FIG. 1A, cut, sweep or otherwise blow grass, leaves, twigs or snow, i.e., debris, out of rotor housing 20 through outlet port 22, the debris will exit in a direction generally tangential to the circumferential path it followed within rotor housing 20, as indicated by arrow 24, FIGS. 1A and 1B. The debris enters inlet portion 26 still traveling tangentially in the direction of expulsion arrow 24. When deflector vane 34 is in the first position, obscuring second outlet duct 32 (as shown in FIG. 1B), debris passing into inlet port 1 or 26 and traveling in the direction tangential to 24 is subjected to an abrupt change of direction as it is redirected by deflector vane 34 into first outlet duct 30 and is discharged in the direction of first lateral arrow 44. The change of direction as measured at inlet portion 26 may be from about 45 to 100 degrees, and is preferably about 90 degrees, in relation to the direction indicated by arrow 31 near inlet portion 26. The abrupt change of direction causes an increased pressure drop and consequent loss in the force with which the air-entrained debris is discharged between the time it enters inlet portion 26 and when it emerges from first discharge end 30a of first outlet duct 30. The curvature of first outlet duct 30 smoothes the passageway to prevent excessive pressure drop.

On the other hand, when deflector vane 34 is in the second position, in which it closes first outlet duct 30 and opens second outlet duct 32, debris is forced out second outlet duct 32. While second outlet duct 32 changes somewhat the tangential direction of this debris, as indicated by second lateral discharge arrow 46 (shown as a dashed line), the change is slight compared to the change imposed by first outlet duct 30, i.e., generally less than about 30 degrees, e.g., about 20 degrees; and is thus gentle rather than abrupt. Second outlet duct 32 thus expels debris without changing substantially the tangential direction of the debris entering inlet portion 26 from mower outlet port 22 (FIG. 1A). Accordingly, there is a smaller pressure drop experienced by debris discharged from outlet port 22 and expelled from second outlet duct 32 than is experienced when it is expelled through first outlet duct 30. The difference in the force of discharge between first outlet duct 30 and second outlet duct 32, i.e., the difference in pressure drop, is due to the horizontal rotation of blade arms 16a and 16b, and allows for efficient use of the blower device, as explained below.

First outlet duct 30 and second outlet duct 32 discharge debris in different lateral directions, i.e., "laterally opposite" directions, with respect to the direction of travel of the blower device, preferably each at about 90 degrees to the direction of travel (and therefore in respective directions which are 180 degrees opposite to each other), so that the debris is expelled out of the lane occupied by the blower device irrespective of which outlet duct is in operation. In other embodiments, the direction of discharge of either or both outlet ducts may be other than 90 degrees with respect to the direction of travel and the direction of discharge from the first discharge end 30a with respect to second discharge end 32a may be other than 180 degrees. As used herein and in the claims, the term "laterally opposite directions" describes the relative orientation of the discharge ends, and includes configurations of the discharge chute according to this invention in which the directions of discharge out of both discharge ends is 90 degrees with respect to the direction of travel as well as those in which at least one of the discharge ends does not face out at 90 degrees from the direction of travel and in which the directions of discharge are not in 180 degrees opposition.

Figure 4:
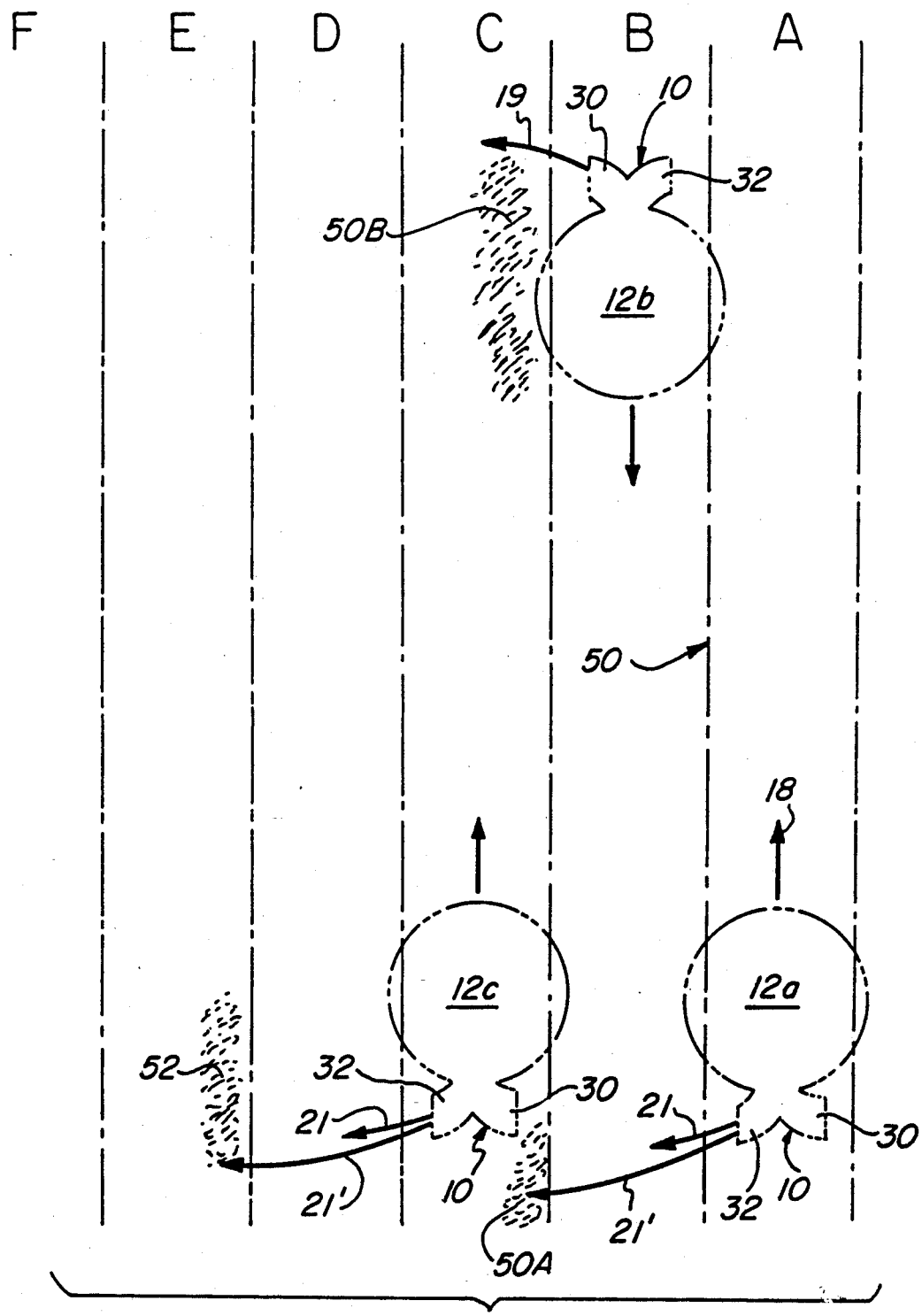
FIG. 4 is a schematic plan view of a mower equipped with a debris chute according to one embodiment of the present invention and debris banks produced therewith.

In use, debris chute 10 is attached to lawn mower 12 which is first propelled in lane A in the forward travel direction of direction arrow 18, FIG. 4, in a first straight line pass over a plot of land. Since lawn mower 12 is equipped with a mower blade which serves as the impeller, lawn mower 12 chops debris in addition to discharging it through debris chute 10. Thus, as a blower device, lawn mower 12 serves a dual purpose of chopping the debris into mulch and then discharging the chopped debris. The plot of land may be littered with debris such as leaves, which the blower device, i.e., the mower, chops into mulch and discharges, and/or the mower may be used to cut grass or other plants, the clippings of which will also produce debris to be chopped into mulch. While in lane A, deflector vane 34 (FIG. 1B) is in the second position so that debris is forcefully expelled to the left of the mower (as sensed by the operator walking behind the mower) in the direction of second debris discharge arrows 21, 21' through second outlet duct 32 establishing a first debris bank which is indicated by hatched line 50A at a distance of slightly more than one lane width from lane A, i.e., into lane C. If a user equipped with a single side discharge mower device of the prior art wished to make a return pass in adjacent lane B, debris would be discharged back into lane A, which had only just been cleared. Consequently, the user of a prior art single side discharge mower would have to retrace his or her steps backward in lane A, pulling the mower backwards, i.e., in reverse, in order to avoid undoing the clearing of lane A while positioning the mower to start on line B in the same travel direction used on lane A. Alternatively, the user would have to turn the device off or close the dicharge chute while re-traversing lane A to reposition the mower at the beginning of lane B adjacent to where he started in lane A. From that point, the user could then turn the device on and proceed in lane B in the same direction as he did in lane A, to discharge debris once again to the left, and away from the previously cleared lane. In either case, twice the number of passes (one active mulching; debris-clearing pass and one inactive return pass) would be required as compared to use of the present invention, in which each pass travels in a direction opposite to the proceeding pass and is an active mulching, debris-clearing pass.

Thus, a user equipped with a device according to this invention may, upon traversing lane A and reaching the end of the plot of land in question, simply turn around for an active return pass in lane B, moving the mower approximately one lane width to the left (as sensed in FIG. 4), into lane B of FIG. 4. The user will usually position the mower so that during each pass after the first the blower device partly overlaps the path cleared during the immediately preceeding pass so that there is no unsightly uncleaned "ribbon" left between lanes. Therefore, one lane width is preferably a distance somewhat less than the diameter established by cutting blade arms 16a and 16b (FIG. 1A).

To avoid directing debris onto the cleaned area (i.e., back into lane A or further to the right in the drawing) during the return pass in lane B, the user, after completing the pass in lane A and before starting the pass in lane B, adjusts deflector vane 34 from the second position to the first position so that debris is expelled to the user's right, in the same direction as in the first pass, i.e., in the direction from lane A toward lane D as indicated by first debris discharge arrow 19. By placing deflector vane 34 in the first position, however, the force with which debris is discharged is diminished because of the greater pressure drop sustained by the air and entrained debris due to the abrupt change in direction required in passing through first outlet duct 30, as described above. Accordingly, during the second pass, the debris is re-mulched and additional debris is chopped into mulch and discharged to a position where it accumulates on the first debris bank 50A, which is thereby enlarged as shown at 50B. The diminished force is indicated in FIG. 4 by showing first debris discharge arrow 19 in lane B as a single arrow, contrasted with the double second debris discharge arrows 21, 21, signifying greater discharge force, in lanes A and C. During this second pass, any debris which fell short of the first debris bank on the first pass is also blown into place. This allows the user, in effect, to make a double pass over lane B without actually having to direct the blower device over that lane more than once. With a mower equipped with a conventional debris chute, which discharges debris in only one direction, two passes over lane B with the mower facing in the same direction would be needed to accomplish this degree of efficiency. This would require that the user pull the mower backward over lane B after the forward first pass to avoid discharging debris in the wrong direction. Such backward-pulling is difficult and dangerous as the user may fall and be injured by the mower. Alternatively, the user could turn the mower around to return to the starting position for the second pass, shuting off the mower or blocking off the discharge chute during the intervening pass while to avoid directing debris in the wrong direction. In either case, the job is less difficult and time-consuming when the chute according to this invention is employed inasmuch as it at least halves the number of passes required.

When the user has completed the second pass in lane B, he once again reverses direction, moves over one lane width to lane C (which results in slight overlap of the mower with lane B) and repositions deflector vane 34 into the second position so that debris will be expelled away from lane B as he advances in lane C. However, since debris bank 50B is disposed in lane C, the blower device re-mulches and forcefully discharges the debris bank 50B in its entirety to a new position, indicated as second bank 52 in lane E which, as before, is at a distance from lawn mower 12 which accommodates one intervening pass in lane D. This process is repeated so that debris is always expelled toward the uncleaned portion of the land (i.e., to the left in FIG. 4).

Preferably, before making passes in parallel lanes (A, B, C etc. in FIG. 4) over the area to be cleaned, the user propels the blower device around the entire periphery of the area to be cleaned and/or cut, directing the mulch debris toward the center of the area at all times. By making, for example, two such peripheral passes, the user creates a cleaned peripheral margin about the area to be cleaned. Then, in making the linear passes described above, the user can use the cleaned marginal region as a turn around margin in which the blower device can be swung about without expelling blown debris in an uncontrolled fashion.

A particular advantage realized in using this invention is that as mulch debris is repeatedly chopped in alternate passes, it is reduced in particle size and therefore in bulk volume, as discussed above. As to leaf blowers, they merely move leaves and other debris (in a manner which is difficult to control) and effect no size reduction (mulching) and therefore no reduction in the volume of debris. The device of the present invention not only continuously mulches and re-mulches the debris, but provides controlled movement of the debris as compared to leaf blowers or uncontrolled discharge from single-chute discharge devices. The mulch debris ultimately produced according to this invention, therefore, is easier to package and dispose of than the relatively bulky debris produced using conventional devices. For example, in use on tree leaves scattered on a lawn, it has been demonstrated that the repeated chopping action provides approximately a 70% reduction in debris volume. Thus, a quantity of fallen leaves which would normally fill ten disposal bags is reduced in volume so that only three such bags are required to hold the mulch debris they produce.

To obtain the maximum benefit from the greater thrust with which debris is expelled through second outlet duct 32, bifurcated outlet portion 28 is preferably configured so that second outlet duct 32 expels debris at a lower level, i.e., closer to the ground, than does first outlet duct 30. This is accomplished by configuring second outlet duct 32 so that it has a slight downward sweep as shown in FIG. 4, and discharges debris closer to ground level (indicated by line G) than first outlet duct 30. This allows debris expelled through second outlet duct 32 to "strike" the base of an adjacent debris bank so that it may effectively move the bank as the user progresses in a given pass. Damper member 42 may be positioned to maximize this effect. On the return pass, when debris is expelled through first outlet duct 30, it is expelled at a slightly higher elevation and with less force so that it is deposited on top of the existing bank.

The debris chute according to this invention may be attached to the lawn mower or other debris-expelling device with any conventional securing means. For example, debris chute 10 may include a mounting hole 54, FIG. 3, which is designed to threadably receive thumb screw 56 and to pass thumb screw 56 into a corresponding hole in the housing of the principal device, e.g., rotor housing 20. Alternatively, rotor housing 20 (not shown) may be equipped with clips and inlet duct portion 26, may have a peripheral lip to allow the clips to secure debris chute 10 over outlet port 22. Of course, other conventional mounting means may be employed. While the foregoing discussion has addressed the use of this invention with regard to a push-type mower, the invention will likewise find utility in conjunction with larger devices, which may be driven, for example, by motor vehicles.

While the present invention has been described with respect to particular embodiments, this is not intended as a limitation to the invention, and other embodiments, evident to those skilled in the art, will be recognized as falling within the spirit of the invention and the scope of the appended claims.

What is claimed is:

1. A bi-directional debris chute for use in combination with a ground blower device having a horizontal rotating impeller which expels blown debris through an outlet port, the debris chute comprising:

an inlet portion connectible to the outlet port of the blower device for receiving debris therefrom;

a bifurcated outlet portion in flow communication with the inlet portion for discharging blown debris from the debris chute, the bifurcated outlet portion comprising a first outlet duct terminating in a first discharge end and a second outlet duct terminating in a second discharge end, the first and second discharge ends facing in laterally opposite directions to respectively discharge blown debris to laterally opposite sides of the debris chute, the first and second outlet ducts being dimensioned and configured so that the first outlet duct imposes a greater pressure drop upon the blown debris than does the second outlet duct whereby, at a given output level of the impeller, blown debris is discharged with greater force from the second outlet duct than from the first outlet duct; and an adjustable deflector vane mounted in the debris chute and movable between a first position in which the first outlet duct is open and the second outlet duct is blocked, and a second position in which the first outlet duct is blocked and the second outlet duct is open, for selectively discharging the blown debris from only one of the first and second outlet ducts.

2. The debris chute of claim 1 in combination with a propellable blower device comprising a housing defining an outlet port for expelling debris from the housing, a horizontally rotating impeller rotatably mounted within the housing for impelling debris in a horizontal circular path within the housing, and further comprising power means mounted on the housing for rotating the impeller.

3. The debris chute of claim 2 wherein the impeller comprises a cutting blade.

4. The debris chute of claim 2 wherein the blower device is a powered lawn mower having a mower blade and the mower blade comprises the impeller.

5. The debris chute of claim 1 or claim 2 wherein the first outlet duct is dimensioned and configured to discharge blown debris at a greater height from the ground than the second outlet duct.

6. The debris chute of claim 1 or claim 2 wherein the first outlet duct is dimensioned and configured to impose on the blown debris approximately a ninety degree change in direction from the direction of peripheral rotation of the impeller in the vicinity of the inlet duct, and the second outlet duct is dimensioned and configured to impose on the blown debris a change of direction of less than about thirty degrees from the direction of peripheral rotation of the impeller in the vicinity of the inlet duct.

7. The debris chute of claim 6 wherein the first outlet duct is dimensioned and configured to discharge blown debris at a greater height from the ground than the second outlet duct.

8. The debris chute of claim 6 wherein the adjustable deflector vane has a contour which is curved to conform to the curvature of the first outlet duct when the deflector vane is in its second position.

9. The debris chute of claim 6 further comprising a pair of adjustable damper means respectively mounted on the first and second discharge ends for controlling the discharge of blown debris therefrom.

10. A method for clearing debris from a littered area using a device adapted to be propelled over the area in selected travel directions, to expel debris selectively in one of first and second opposite lateral discharge directions with a greater degree of force in the first discharge direction than in the second discharge direction, the method comprising:

selecting the first discharge direction and making a first pass by propelling the device in a first travel direction in a first lane, to deposit debris and form a debris bank located more than one lane from the first lane; and selecting the second discharge direction and making a second pass in a second travel direction opposite to the first travel direction in a second lane abutting and parallel to the first lane and located between the first lane and the debris bank, whereby debris is discharged during the second pass in the same direction as in the first pass and the debris is deposited on the debris bank.

11. The method of claim 10 further comprising making subsequent passes in sequentially adjacent lanes, and alternating the travel direction and the discharge direction on each subsequent pass.

12. The method of claim 10 or claim 11 wherein clearing debris includes chopping the debris into mulch debris.

13. The method of claim 10 or claim 11 including operating the device to overlap a minor portion of each prior lane.

* * * * *